United States Patent [19]

Carter et al.

[11] Patent Number: 5,280,757
[45] Date of Patent: Jan. 25, 1994

[54] MUNICIPAL SOLID WASTE DISPOSAL PROCESS

[76] Inventors: George W. Carter, 800 Chapman Blvd., Ottawa, Canada, K1G 1T9; Andreas Tsangaris, 29 Confederation Private, Ottawa, Canada, K1V 9W6

[21] Appl. No.: 930,020

[22] Filed: Aug. 13, 1992

Related U.S. Application Data

[63] Continuation-in-part of Ser. No. 868,024, Apr. 13, 1992, Pat. No. 5,222,448.

[51] Int. Cl.$^5$ .............................. F23G 7/04
[52] U.S. Cl. ................... 110/346; 48/209; 48/210; 110/250; 588/227
[58] Field of Search ............ 110/346, 250; 588/227; 48/203, 209, 210

[56] References Cited

U.S. PATENT DOCUMENTS

| | | | |
|---|---|---|---|
| 4,989,522 | 2/1991 | Cline et al. | 110/250 |
| 5,010,829 | 4/1991 | Kulkarni | 110/346 |
| 5,095,828 | 3/1992 | Holden et al. | 110/250 |

Primary Examiner—Edward G. Favors
Attorney, Agent, or Firm—Donald W. Margolis

[57] ABSTRACT

A plasma arc torch is used as an independent heat source in an enclosed reactor vessel to gasify municipal solid waste and produce a medium quality gas and an inert monolithic slag having substantially lower toxic element leachability. The gas has lower levels of metals and semi-volatile organic compounds, particularly dioxins and furans. Other materials may also be gasified, for example, coal, wood and peat.

8 Claims, 2 Drawing Sheets

MUNICIPAL SOLID WASTE DISPOSAL PROCESS

This is a continuation-in-part application of application Ser. No. 868,024 filed Apr. 13, 1992, U.S. Pat. No. 5,222,448 and cross-referenced below.

CROSS-REFERENCE TO RELATED APPLICATION

The present invention is related to co-pending application Ser. No. 868,024, filed Apr. 13, 1992, and entitled PLASMA TORCH FURNACE PROCESSING OF SPENT POTLINER FROM ALUMINUM SMELTERS by George W. Carter, George W. Morgenthaler and Jeffrey L. Struthers, which application is incorporated herein by reference.

BACKGROUND OF THE INVENTION

1. Field of the Invention

The present invention relates to methods for disposal of wastes in general, and in particular to a method for gasification of municipal solid waste by means of a plasma arc torch in an enclosed, refractory lined, reactor vessel.

2. Prior Art of the Invention

The daily generation of solid wastes is a fact of life in industrialized society and their disposal is becoming an ever-increasing problem. The more common of these waste materials is Municipal Solid Waste (MSW). Disposal of MSW through landfill is becoming increasingly less attractive and more difficult as sites are becoming full, alternate sites are becoming scarce and the knowledge and reality of contamination of groundwater, adjacent facilities and property are becoming more prevalent and disconcerting. In the search for more efficient and less costly disposal, Energy From Waste (EFW) technologies are being developed which also create energy as a byproduct of the destruction process. The most widely known type of EFW facility is incineration in various forms; however, incinerator EFW system require extensive air pollution control systems to reduce emissions below regulatory levels and they also produce toxic flyashes. EFW systems based on the gasification process have more inherent promise for lower emission of all environmental contaminants through both a cleaner and a lower volume of product gas, and a cleaner solid residue.

Several United States patents relating to processing of waste are known. They are:
U.S. Pat. No. 3,780,675, issued Dec. 25, 1973
U.S. Pat. No. 4,644,877, issued Feb. 24, 1987
U.S. Pat. No. 4,688,495, issued Aug. 25, 1987
U.S. Pat. No. 4,770,109, issued Sep. 13, 1988
U.S. Pat. No. 4,831,944, issued May 23, 1989
U.S. Pat. No. 4,861,001, issued Aug. 29, 1989
U.S. Pat. No. 4,886,001, issued Dec. 12, 1989
U.S. Pat. No. 4,980,092, issued Dec. 25, 1990
U.S. Pat. No. 4,989,522, issued Feb. 5, 1991

SUMMARY OF THE INVENTION

Over the years a wealth of experience and knowledge has been gained in the plasma processing of carbonaceous materials, it was therefore recognized that an EFW plant using a plasma arc torch to gasify MSW could be a viable alternative to the processes currently in use. Extensive experimentation by the present inventors through 1988 proved that plasma gasification was an energy efficient method for the disposal of MSW. Plasma gasification experimentation continued in December 1990 in the Plasma Research Facility. Environmental sampling and analyses were conducted. The results demonstrated that plasma gasification of MSW can be used in place of conventional incineration with resultant environmental benefits related to gaseous emission levels and solid residue properties. Emissions to the atmosphere contain appreciably lower levels of metals and semi-volatile organic compounds than other state-of-the-art technologies, particularily dioxins and furans. The slag is monolithic with toxic element leachability levels substantially lower than the Environmental Protection toxicity standards current in the Provinces of Ontario and Quebec, Canada. Analyses also indicated that there are potential commercial uses of the by-product slag.

Municipal Solid Waste (MSW), more commonly referred to as city refuse, has generally been estimated at 1.7 kg/capita/day which equates to approximately 62,000 tonnes per year for a population of 100,000. This volume has remained very stable over the past few years even in light of recycling schemes, probably largely due to an increasing throwaway attitude symbolic of fastfood outlets and the growth of packaging for microwave cooking. However, regardless of these increasing or decreasing trends, there will remain a tremendous amount of everyday refuse for which reliable collection, handling and disposal must be provided.

The process of the present invention has cost, size, operability and environmental advantages over current disposal methods. These benefits are not found in current disposal processess, and make plasma gasification particularily advantageous for the disposal of the portion of MSW which is left after recycling and which would otherwise be disposed of at a landfill site. The innovative features of the present invention include:

a. Independent heat source—provides flexibility since it can be controlled at will and can process material from very little to its maximum capability and still operate at an optimal operating point. This relative ease of controllability makes it particularly amenable to off-peak processing to substantially reduce input electricity charges;

b. Higher processing temperature and heat transfer rate constantly available—conducive to the breakdown of most chemical bonds with the prospects of forming non-polluting compounds;

c. Processing temperatures can be varied and maintained at will to meet varying refuse composition demands—unaffected by seasonal variations in moisture content in input material;

d. Small size—results in lower capital cost and easier integration in existing facility infrastructure. Installation can even be underground for noise abatement and to prevent a more aesthetically pleasing appearance;

e. Two distinct processes before exhausting to the atmosphere—distinct separation between the gasification process and the combustion process to minimize problems associated with the direct combustion of the input material;

f. Very little oxygen (much less than for stoichiometric combustion) present through the process—results in minimal combustion and a richer product gas;

g. Non-combustibles in the input material, such as glass, metals, dirt, etc., melt and chemically combine into a dense, inert slag—the molten slag acts as a secondary heat transfer medium on the bottom of the vessel;

h. Flammable gas produced as a discrete product—provides system flexibility. It caters to varying energy demand needs since the product gas can be combusted immediately, piped elsewhere or stored for later use. Combustion can be accommodated in existing boilers to negate the requirement for an additional smokestack with its inherent high degree of public rejection;

i. Reaction of the moisture in the input MSW with the free carbon to form additional combustible products—results in the virtual complete removal of carbon from the input material;

j. Small volume of product gas to be treated by scrubbers—cost and complexity of pollution control equipment is minimized;

k. Scrubber effluent water can be recirculated periodically—can be reinput to the process for treatment to dispose of pollutants;

l. Cyclone ash can be recirculated periodically—use as an input material to the process can eliminate separate disposal requirements;

m. Immense volume reduction from shredded refuse to slag—would be even greater with as—received;

n. Inert, non-leachable slag may have cost effective commercial uses—eliminates the need for landfill and its inherent liability.

BRIEF DESCRIPTION OF THE DRAWINGS

The preferred embodiments of the present will now be described in detail in conjunction with the attached drawing figures, in which.

DETAILED DESCRIPTION OF THE PREFERRED EMBODIMENT

Figure 1:
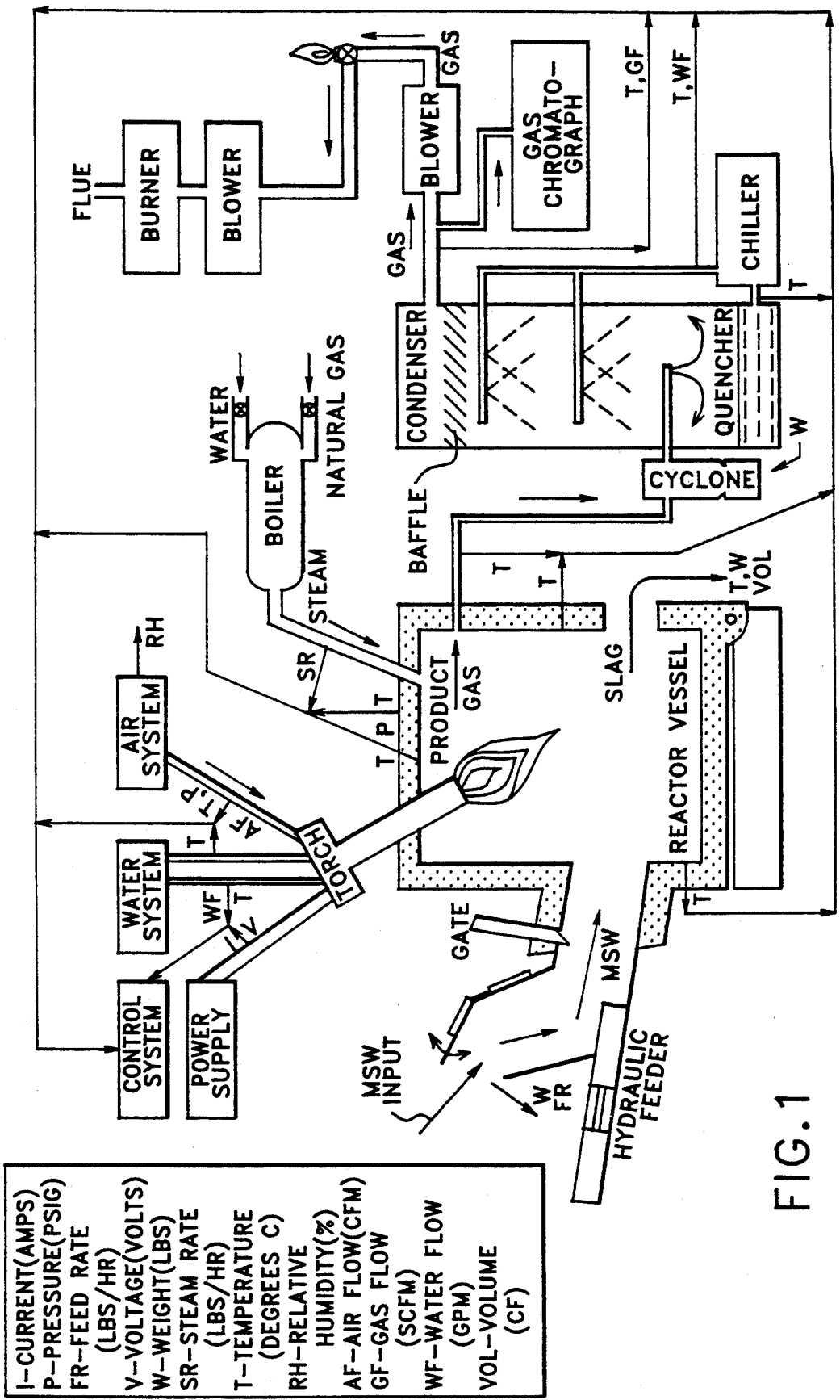
FIG. 1 is a diagram showing the entire system for carrying out the process of the present invention.
Figure 2:
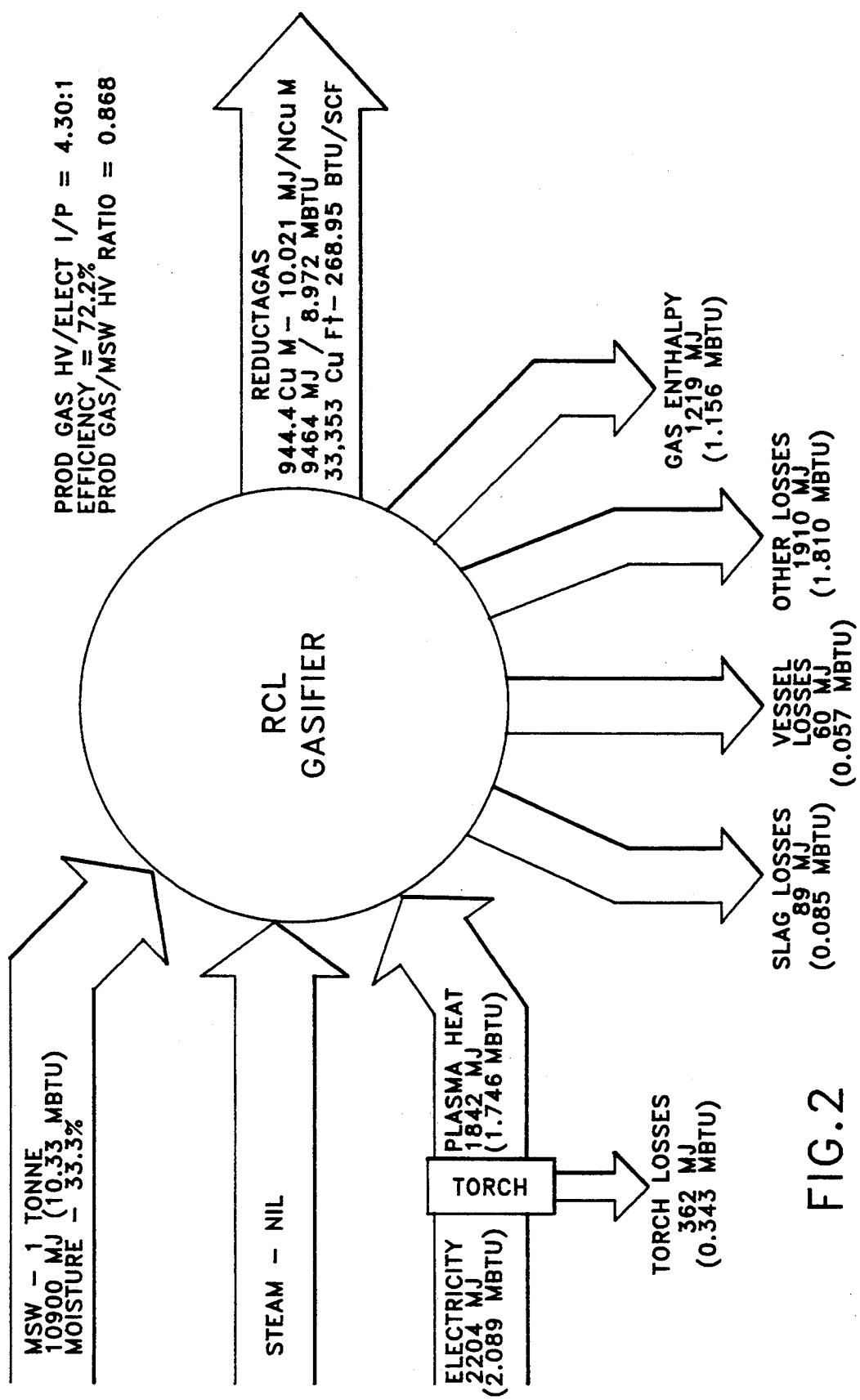
FIG. 2 is a diagram illustrating the projected heat balance of a commercial system in accordance with the process of the present invention.

The preferred embodiment of the present invention is the experimental Plasma Research Facility (PRF) configured for the gasification of solid waste materials. With reference to FIG. 1, it consists of a 150 KW plasma heating system, a refractory lined reactor vessel, a material feeding subsystem and a process control subsystem. In addition, a product gas burner subsystem was added for this project. The major components of the PRF are described below. The maximum throughput of the experimental PRF is 400 pounds per hour of "as-received" MSW.

Plasma Heating System (PHS): The PHS consists of a power supply which converts three phase AC into DC to feed a single 150 KW non-transferred plasma arc torch. The normal operating range of the plasma arc torch is 300–400 VDC at 400–500 amps. The power supply consists of a transformer, three saturable core reactors, a rectifier, a low energy plasma starter and a ballast resistor. The plasma starter, commonly referred to as the Low-Energy Plasma (LEP) igniter, is used to provide a very high step voltage to ignite the plasma and start the torch. The plasma gas is generated from air, with the flowrate continually varied by an air modulator to vary the arc attachment point on both electrodes, thereby increasing the useable life of these electrodes. Standard city water is used to cool the torch. A water cooled ballast resistor is used in series with the torch power to eliminate great fluctuations in the torch operating current and voltage. Torch power, plasma gas flow and torch cooling are controlled through interlocks on the process control console to turn off the torch when parameters are not maintained within certain prescribed limits.

Reactor Vessel: The reactor vessel is tubular, with a height of 1.17 meters (m) and a diameter of 1.12 m, mounted in a tiltable frame. Its 19.1 centimeters (cm) of refractory lining can withstand a temperature of up to approximately 1850 deg C. Material feeding is accommodated through a 40 cm square opening on one side and, directly opposite, slag extraction is accommodated through a 20 cm square opening covered by a swinging door. Directly above the slag opening is a 10 cm circular opening for product gas extraction. A 20 cm circular port is situated near the bottom of the vessel and on one side to accommodate the insertion of a gas burner for preheating. The torch enters the top of the vessel at an angle through a 15 cm circular port. Water cooled viewing ports are installed on the top and side of the vessel for visual inspection inside the vessel; nitrogen or air can be injected on the inside of these viewing ports to keep them free of carbon deposition. A 2.5 cm inlet to the vessel provides a capability to inject steam should it be required by the process. Thermocouples are installed to monitor the temperature of the product gas at exit, the vessel outside wall, and the inside of the refractory at the top, middle and bottom of the vessel.

Material Feeding Subsystem: The material feeding subsystem consists of a rectangular feedhopper 40 cm wide, 75 cm long and 1 m high, slightly diverging towards the bottom to diminish the possibility of material blockage. The feed chute leading into the vessel is 40 cm square to match the vessel feed opening. A hydraulic assisted ram, 40 cm wide by 7.5 cm high with the top completely covered to prevent material falling behind the plunger, is used to push material from the feedhopper into the vessel through the feed chute. A gate is installed in the middle of the feed chute to act as a heat barrier between the vessel and the feedhopper. A lid is installed on the top of the feed hopper to provide a seal from the ambient environment. The feeder is totally enclosed so that gases do not leak back into the work space; however, relief valves have been installed to circumvent the sudden buildup of pressure within the feeder. Limit switches on the feeder control the length of the ram stroke so that the amount of material fed into the vessel with each stroke can be controlled.

Product Gas Handling Subsystem: The product gas exits the vessel through a 10 cm diameter section of flexible stainless steel piping to permit the vessel to be tilted without breaking the integrity of the gas handling subsystem. The product gas then passes through a cyclone, which removes particulate matter, and into a spray quencher. The quencher consists of a tank, 90 cm in diameter and 3 m high, with ten layered nozzles to ensure that all of the product gas is sprayed to remove acids and other constituents. The quencher water is pretreated with lime, to neutralize the acids and facilitate later disposal, and circulated through a series of filters and a chiller to maintain a relatively clean and cool spray. After passing through the quencher the product gas passes through a baffle and a series of condenser evaporator coils to ensure as dry a product gas as possible for subsequent quantitative analyses. The product gas is then sampled for on-line Gas Chromatograph analyses and passed through an orifice for flowmeter printout. A blower is used to draw the product gas through the gas handling subsystem to maintain a slight negative pressure within the vessel to further prevent gas leaks into the lab work space. The product gas is then vented to the atmosphere through a 5 cm pipe and flared immediately upon exit.

Slag Handling Subsystem: The molten slag is allowed to accumulate at the bottom of the vessel through the full duration of the experiment. Slag accumulation up to 20 cm deep can be accommodated before it is necessary to empty the vessel. The entire vessel is then hydraulically tilted and the slag is allowed to pour into a bed of silica sand.

Process Control Subsystem: The process control subsystem consists of a series of on/off switches and instruments. The operator has instantaneous and continuous readout of critical operational parameters of the process such as:
a. torch position within the reactor vessel;
b. torch operating current and voltage;
c. torch air input pressure and flowrate;
d. torch coolant water input/output temperatures and flowrate;
e. input material feedrate;
f. process temperatures within and around the reactor vessel;
g. product gas quencher/condenser input/output temperatures;
h. product gas quencher water input/output temperatures and flowrate;
i. reactor vessel pressure; and
j. product gas flowrate and temperature.

Several interlocks are incorporated in the instruments which trigger shutdown of the torch when certain parameters exceed preset values. The operator has the ability to instantaneously change operating parameters such as the material feedrate, the air flowrate through the torch and the power delivered to the torch, as well as instantaneously turn the torch on and off depending on other requirements of the process.

Product Gas Burner Subsystem: A 3600 Cubic Feet per Hour (CFH) sparkproof blower draws product gas from the main product gas line just before its exit to the atmosphere and passes it through an 8 cm reducing to 2 cm pipe to a 10-50,000 BTU/hr burner mounted in a 30 cm diameter by 100 cm stainless steel combustion chamber. A 15 cm flue conveys the products of combustion directly to the atmosphere.

DESCRIPTION OF THE PROCESS

The heat supplied by the PHS pyrolyzes the input material, as opposed to incinerating it, since air is excluded from the process. There is always some air which enters the process with the input material; however, this can be minimized by particular attention to feeding procedures, such as compression of the material to exclude most of the air or by partially vacuumizing the input hopper after it is filled and closed. The only other air available to the process is through the gas system used to generate the plasma in the torch and this source provides less than 2% of the oxygen required for stoichiometric combustion. This level of oxygen can be reduced even further by recycling the product gas from the gasification process or by using an inert gas to generate the plasma. Pyrolysis provides for virtual complete gasification of all volatiles in the source material, while non-combustile material is reduced to a virtually inert slag. The free carbon produced through the gasification of the volatiles reacts with the water in the input material forming additional combustible gases.

In a typical gasification application, the source material is fed into the reactor vessel with no preprocessing except possibly for the shredding of very large and bulky objects to enable trouble free feeding into the vessel. The reactor vessel is lined with refractory to permit the high temperatures required for processing to be achieved and for the retention of the heat within the vessel. The source material is gasified at a temperature of approximately 1100 deg C. (dependent on the source material). Steam can be injected directly into the process or water can be added directly to the input material as required to provide additional oxygen to react with the free carbon. The resultant products are a product gas with a heating value one-quarter to one-third the heating value of natural gas, and a virtually inert slag. The product gas can be fed directly to other equipment and/or processes for combustion, or if immediate use is not required, it can be stored or flared directly. This product gas has a high hydrogen content and it contains a high enthalpy directly from the high temperature pyrolysis process; therefore, it burns very cleanly and efficiently. The slag must be cooled and then it can be disposed of very easily. Depending on the type and composition of input material the slag can also have commercial application. The slag from the gasification of municipal solid waste, for example, can be used in applications similar to crushed stone or it can be molded into building type blocks directly from its liquor state.

The PPS is a closed loop system; therefore, it forms an environmental control in itself. The high process temperatures achievable by plasma processing ensure rapid and complete breakdown of chemical bonds and avoid the particulates and partially combusted hydrocarbons normally associated with combustion processes. Total gasification can be achieved very efficiently. The general absence of oxygen results in significantly less air pollution from contaminants such as nitrogen oxides (NOX) and sulphur dioxide (SO2) than is associated with conventional gasification processes.

The size of the plasma arc torch utilized in the PPS is normally selected on the basis of the type and quantity of input material which must be processed in a specific period of time. This in turn dictates the size of the reactor vessel required and the capacity of the electrical power source. Plasma arc torches are available in varying sizes with power ratings from 50 KW to 6MW.

The basic disposal process proceeds as follows:
(i) Municipal Solid Waste (MSW) is fed into the reactor vessel with special precautions to minimize the amount of air which enters the vessel at the same time. The reactor vessel has been preheated to a minimum inside wall temperature of/100 degrees C.
(ii) The volatile content of the input material begins to decompose and is expelled from the input solid mass as gases as soon as the material enters the vessel because its temperature rises sharply due to heat radiation from the inside walls of the vessel and the direct radiation from the plasma arc torch flame.
(iii) When these gases encounter the higher temperatures around the plasma flame they completely ionize within milliseconds because their temperature rises very rapidly due to heat acquired from the hot plasma flame gases. This rapid ionization can be described as the molecules literally being torn apart as they acquire massive amounts of heat in a very short period of time.
(iv) The non-decomposed material is forced to move around the vessel as the gases from the plasma torch suddenly acquire the high temperatures encountered around the plasma arc andexpand very rapidly. Motion is also due to the geometry of the inside of the reactor vessel which forces the material to flow through the plasma flame to a different level as it becomes molten.

(v) As the solids pass under the plasma arc torch flame, which is through the highest temperature profile, the volatile content is completely expelled, the free carbon is converted to mostly Carbon Monoxide with small amounts of Carbon Dioxide, and the solid residue becomes completely molten and subsequently combines chemically to form metal silicates. The vessel floor temperature is also at a temperature of 1100 degrees C., the same as the vessel inside wall and ceiling temperature, but as the glass, metals and dirt become molten and chemically combine, they remain in a molten pool over the floor of the vessel and are subjected to the higher temperature profile directly radiated from the plasma arc flame. This temperature can be upwards of 1400 degrees C. and even higher where the torch plasma flame is concentrated.

(vi) This molten bed of solid residue acts as a secondary heat source for new material entering the vessel so that this new material is heated from all sides, including the bottom.

(vii) The solid residue is permitted to remain in the vessel until it reaches a preset volume, at which time it is tapped and permitted to flow from the vessel into a catch container. The physical properties of this solid residue can be altered by varying the temperature of the melt and by the amount of water content in the input material. Increasing the temperature of the melt will make it more fluid and increase its fragility. Decreasing the water content will increase the carbon content in the melt and increase the hardness of the final product.

(viii) Some uncombined metal globules are encapsulated by the silicates previously formed in the solid residue. This occurs either because these metals, or metal alloys, have a higher melting temperature than what they are being subjected to, or there is no additional silica with which they can combine to form additional silicates.

(ix) All other non-volatile and unreacted material is encapsulated by the silicate mass which results in the entire mass having extremely low leachability characteristics. The solid residue has the structural integrity to be considered a monolith.

(x) Upwards of 98% of the metals in the input material are trapped in the very tight matrix of the solid residue. Digestion of this solid residue in aqua regia, a solution of hydrochloric and nitric acids, results in 50 to 54% of the original material remaining as a solid mass.

Carbon bearing materials which can be efficiently gasified in this manner include coal, peat, wood and municipal solid waste (city refuse), as well as incinerator ash.

The system may be operated by a single operator monitoring critical parameters of the process through meter readouts on the control console. All critical parameters are interlocked to automatically shutdown the operation should any of these parameters exceed predetermined tolerances. The operator also has instantaneous control of the operation and can shutdown the process and bring it back up virtually at will. These operator functions are quite straight forward and no more demanding than those found in most industrial control systems.

Input materials handling will normally require a materials handler. The input process and design complexity will be dictated by the quantity and type of input material to be processed. Mostly manual operation may be possible with a very low quantity input volume.

Output slag handling will normally require a slag handler. Again, the output process and the design complexity will be dictated by the volume and physical composition of the slag to be handled.

The system heat input process can be turned on and off virtually at the will of the operator. Vernier controls on torch input power also permits a varying input load to be readily catered to up to the maximum capacity of the system while maintaining the optimal heat transfer rate to the process. Conversion of a system to one of a larger size can also be accommodated very easily; a larger size torch can be used, a second torch can be added to the reactor vessel, or an additional PPS can be added. The cost of either of these options would normally be small compared to the initial cost outlay.

The energy aspects of the experimental plasma gasification of MSW was conducted. A summary of the results obtained and extrapolated to a 50-75 Tonne Per Day commercial size system is as follows:

|  | LABORATORY RESULTS | COMMERCIAL SIZE EXTRAPOLATION |
| --- | --- | --- |
| Conversion Ratio (Energy Out/In) | 1.65:1 | 4.30:1 |
| Overall Efficiency | 56.0% | 72.2% |
| Product Gas/Refuse HV Ratio | 0.847 | 0.868 |
| Product Gas HHV (BTU/SCF) | 282.15 | 282.15 (max) |
| Dry Refuse/Slag Weight Reduction | 5.37:1 | 5.37:1 |
| Wet Refuse/Slag Weight Reduction | 8.06:1 | 8.06:1 |
| Refuse/Slag Volume Reduction | 154:1 | 154:1 |
| El Energy per Tonne Refuse (KWhrs) | 1595 | 612 |

Commercial size extrapolation includes known improvements obtainable through the use of a larger size and more efficient plasma arc torch, the use of additional refractory lining in the wall of the reactor vessel and economies of scale for heat losses. Conversion ratio is defined as the energy available in the product gas compared to the electrical energy input to the process which created the product gas. A conversion ratio of 4.3:1, therefore, means that for every BTU of thermal energy input to the process through the plasma arc torch there are 4.3 BTUs of usable energy in the product gas. This ratio does not consider any energy recovery from the sensible heat in the hot product gas, the hot slag or the torch cooling water, which account for the majority of the 28% losses in the process.

The product gas obtained through this experimentation had the following chemical composition at the maximum heating value obtained:

| | |
|---|---|
| Hydrogen | 41.2% |
| Carbon Dioxide | 8.3% |
| Ethylene | 0.1% |
| Acetylene | 0.2% |
| Oxygen | 0.3% |
| Nitrogen | 17.0% |
| Methane | 3.2% |
| Carbon Monoxide | 29.7% |
| Heating Value | 282.2 BTU/SCF |

ENVIRONMENTAL CONSIDERATIONS

Experiments were undertaken to assess the environmental quality, following the parameters and procedures established by the Ontario Ministry of the Environment, of the following products from the plasma gasification of MSW:

a. the product gas for organics, acid gases and trace metals;
b. the condensate from drying the product gas (and quencher water) for organics, acid gases and trace metals;
c. the combustion gases from burning the product gas for organics, acid gases and trace metals; and
d. the solidified slag for trace metals and leachate toxicity.

In addition, the following aspects were also determined.

a. product gas chemical composition and heating value;
b. slag chemical composition;
c. slag potential commercial applications; and
d. process mass and energy balances.

Product gas and gas borne particulate samples were obtained after the quencher outlet and after the burner, and analysed for Semi-Volatile Organic Compounds (SVOC), metals, and acid gases, including nitrogen oxide and sulphur dioxide. Combined quencher and condensate water samples were analysed for SVOCs, metals and acid gas anions. Samples of slag were analyzed for chemical composition and leachate toxicity. Acid insoluble portions of the slag were also analysed.

The results summarized in the following tables include typical incinerator results, where available from Environment Canada's National Incinerator Testing & Evaluation Program (NITEP) publications, for comparison purposes, from the Prince Edward Island (PEI) Incinerator (2), Quebec Urban Community (QUC) Incinerator (3)(4), Victoria Hospital EFW Facility (London), London, Ontario (5), and Solid Waste Reduction Unit (SWARU), Hamilton, Ontario (6). In addition, where applicable, Ontario Regulation 309 (7) and Quebec (8) limits are specified.

Semi-Volatile Organic Compound (SVOC) Emissions

Tables 1 & 2 show SVOC emissions during the two tests. Table 1 relates the amount of contaminant measured in the emissions to the amount of material fed during the test run in micrograms (ug), or milligrams (mg), of emission per tonne of input material. Table 2 shows the concentration of the contaminants emitted per normal cubic meter (NCuM) at standard conditions of 25 degC, 101.3 kilopascals (kPa) and dry. The following abbreviations are used throughout Tables 1 & 2.

Legend:
PCDD—Polychlorinated dibenzo-p-dioxins (Dioxins).
PCDF—Polychlorinated dibenzofurane (Furans).
CP—Chlorophenyls.
CB—Chlorobenzenes.
PCB—Polychlorinated Biphenyls.
PAH—Polycyclic Aromatic Hydrocarbons.
TEQ—Toxic Equivalency

TABLE 1

| | SVOC EMISSION DATA (Emissions per tonne of 35% wet feed) | | | | | |
|---|---|---|---|---|---|---|
| | EXPERIMENT NO 1 | | EXPERIMENT NO 2 | | EXISTING INCINERATORS | |
| COMPOUND | QUENCHER OUTLET | BURNER OUTLET | QUENCHER OUTLET | BURNER OUTLET | PEI(2) | QUC(3) |
| TEQ VALUES(9) | | | | | | |
| PCDD (ug) | 0.03 | 0 | 0.3 | 0 | | |
| PCDF (ug) | 3.8 | 0 | 1.0 | 0.8 | | |
| ACTUAL VALUES | | | | | | |
| PCDD (ug) | 16 | ND | 26 | ND | 228-516 | 59-148 |
| PCDF (ug) | 148 | 10 | 47 | 15 | 340-570 | 171-174 |
| CP (ug) | 18900 | ND | 5800 | ND | 10800-29000 | |
| CB (ug) | 8500 | 6900 | 1360 | 980 | 12800-22000 | |
| PCB (ug) | ND | ND | ND | ND | ND-3400 | |
| PAH (mg) | 28000 | 5300 | 187000 | 24000 | 27-55 | |

ND — not detected.

TABLE 2

| | SVOC EMISSION DATA (Concentration per NCuM)* | | | | | |
|---|---|---|---|---|---|---|
| | EXPERIMENT NO 1 | | EXPERIMENT NO 2 | | EXISTING INCINERATORS | |
| COMPOUND | QUENCHER OUTLET | BURNER OUTLET | QUENCHER OUTLET | BURNER OUTLET | PEI(2) | QUC(3) |
| TEQ VALUES(9) | | | | | | |
| PCDD (ng) | 0.02 | 0 | 0.3 | 0 | | |
| PCDF (ng) | 2.8 | 0 | 1.3 | 0.5 | | |
| ACTUAL VALUES | | | | | | |
| PCDD (ng) | 12 | ND | 27 | ND | 62-123 | 19-298 |
| PCDF (ng) | 109 | 3 | 49 | 10 | 95-156 | 44-306 |
| CP (ug) | 14 | ND | 6 | ND | 3-7 | 5-24 |
| CB (ug) | 6 | 3 | 1 | 0.6 | 3-5 | 3-10 |
| PCB (ug) | ND | ND | ND | ND | ND-0.8 | 2-7 |

TABLE 2-continued

| | SVOC EMISSION DATA (Concentration per NCuM)* | | | | | |
|---|---|---|---|---|---|---|
| | EXPERIMENT NO 1 | | EXPERIMENT NO 2 | | EXISTING INCINERATORS | |
| COMPOUND | QUENCHER OUTLET | BURNER OUTLET | QUENCHER OUTLET | BURNER OUTLET | PEI(2) | QUC(3) |
| PAH (ug) | 21000 | 1900 | 195000 | 15000 | 7-12 | 4-22 |

*Normalized to 11% Oxygen at the burner outlet. Existing incinerator concentrations are normalized to 12% Carbon Dioxide and contain 9-13% Oxygen.

Metals Emissions

Tables 3 & 4 summarize the emissions for selected metals analysed for, again under the same comparison conditions.

Acid Gas Emissions

Tables 5 & 6 summarize the acid gas emissions for the two tests, again under the same comparison conditions. Table 6 includes nitrogen oxide and sulphur dioxide emissions in parts per million (ppm). The Chloride, Fluoride and Bromide acid gases were measured as individual ions but reported as the corresponding acids.

TABLE 3

| | EMISSION DATA FOR SELECTED METALS (Gram per tonne of 35% wet feed) | | | | |
|---|---|---|---|---|---|
| | EXPERIMENT NO 1 | | EXPERIMENT NO 2 | | EXISTING INCINERATOR |
| METAL | QUENCHER OUTLET | BURNER OUTLET | QUENCHER OUTLET | BURNER OUTLET | PEI(2) |
| Antimony | 2 | 0.1 | 1 | 0.03 | 2.1-9.6 |
| Arsenic | 0.6 | 0.1 | 0.2 | 0.01 | |
| Cadmium | 0.6 | 0.1 | 0.2 | 0.01 | 2.6-3.8 |
| Chromium | 0.2 | 0.2 | 0.1 | 0.02 | 0.1-0.4 |
| Copper | 29 | 1 | 6 | 0.2 | |
| Lead | 49 | 2 | 18 | 0.3 | 34-60 |
| Mercury | 0.014 | ND | 0.001 | ND | 2.0-3.6 |
| Nickel | 0.3 | 0.2 | 0.1 | 0.04 | 1.0-2.2 |

TABLE 4

| | EMISSION DATA FOR SELECTED METALS (Concentration, mg/NCuM)* | | | | |
|---|---|---|---|---|---|
| | EXPERIMENT NO 1 | | EXPERIMENT NO 2 | | EXISTING INCINERATOR |
| METAL | QUENCHER OUTLET | BURNER OUTLET | QUENCHER OUTLET | BURNER OUTLET | PEI(2) |
| Antimony | 2 | 0.05 | 1 | 0.02 | 0.5-2.6 |
| Arsenic | 0.5 | 0.02 | 0.3 | 0.01 | |
| Cadmium | 0.5 | 0.03 | 0.2 | 0.004 | 0.6-0.9 |
| Chromium | 0.2 | 0.08 | 0.1 | 0.02 | 0.03-0.1 |
| Copper | 22 | 0.5 | 7 | 0.1 | |
| Lead | 37 | 0.6 | 19 | 0.2 | 8.4-15 |
| Mercury | 0.01 | ND | 0.001 | ND | 0.5-0.9 |
| Nickel | 0.2 | 0.08 | 0.1 | 0.02 | 0.2-0.5 |

*Normalized to 11% Oxygen at the burner outlet. Existing incinertor concentrations are normalized to 12% Carbon Dioxide and contain 9-13% Oxygen.

TABLE 5

| | ACID GASES EMISSION DATA (Gram per tonne of 35% wet feed) | | | | |
|---|---|---|---|---|---|
| | EXPERIMENT NO 1 | | EXPERIMENT NO 2 | | EXISTING INCINERATOR |
| ACID GAS | QUENCHER OUTLET | BURNER OUTLET | QUENCHER OUTLET | BURNER OUTLET | PEI(2) |
| Hydrogen Chloride | 223 | 2 | 49 | 0.2 | 3930-4480 |
| Hydrogen Fluoride | 0.3 | 2 | 0.1 | 0.1 | |
| Hydrogen Bromide | ND | ND | ND | ND | |

TABLE 6

| | ACID GASES EMISSION DATA (Concentration)* | | | | |
|---|---|---|---|---|---|
| | EXPERIMENT NO 1 | | EXPERIMENT NO 2 | | EXISTING INCINERATOR |
| ACID GAS | QUENCHER OUTLET | BURNER OUTLET | QUENCHER OUTLET | BURNER OUTLET | QUC(3) |
| Hydrogen Chloride (mg/NCuM) | 146 | 0.6 | 45 | 0.1 | |

TABLE 6-continued

| | ACID GASES EMISSION DATA (Concentration)* | | | | EXISTING INCINERATOR QUC(3) |
|---|---|---|---|---|---|
| | EXPERIMENT NO 1 | | EXPERIMENT NO 2 | | |
| ACID GAS | QUENCHER OUTLET | BURNER OUTLET | QUENCHER OUTLET | BURNER OUTLET | |
| Hydrogen Fluoride (mg/NCuM) | 0.2 | 0.7 | 0.1 | 0.07 | |
| Hydrogen Bromide (mg/NCuM) | ND | ND | ND | ND | |
| Nitrogen Oxide (ppm) | 1710 | 305 | 210 | 158 | 169-246 |
| Sulphur Dioxide (ppm) | 67 | 66 | 52 | 69 | 128-225 |

*Normalized to 11% Oxygen at the burner outlet. Existing incinerator concentrations are normalized to 12% Carbon Dioxide and contain 9-13% Oxygen.

Slag

Table 7 summarizes the analyses of the slag samples for the two tests in micrograms (ug) of metal per gram (g) of slag. The actual analyses were performed on both an acid solution obtained by digesting the slag in a solution of aqua regia, a mixture of hydrochloric and nitric acids, and the insoluble portion remaining after the aqua regia digestion. This insoluble portion represented 50% of the slag sample in Experiment No 1 and 54% of the slag sample in Experiment No 2.

TABLE 7

| ANALYSES | METALS IN SLAG (ug/g) | | | |
|---|---|---|---|---|
| | EXPERIMENT NO 1 | | EXPERIMENT NO 2 | |
| ELEMENT | SOLUTION | INSOLUBLE | SOLUTION | INSOLUBLE |
| Aluminum* | 97,000 | 101 | 92,000 | 3109 |
| Antimony | 9 | 2.36 | 6 | 1.86 |
| Arsenic | 2.5 | ND | 1.5 | 0.37 |
| Barium | 1,260 | ND | 2,400 | 54 |
| Beryllium | 1 | — | 1 | — |
| Bismuth | ND | — | ND | — |
| Boron | 170 | — | 240 | — |
| Cadmium | 1 | ND | ND | ND |
| Calcium* | 107,000 | ND | 103,000 | 1,428 |
| Chromium | 350 | 1.2 | 220 | 18.2 |
| Cobalt | 16 | 0.1 | 11.5 | 0.58 |
| Copper | 980 | ND | 640 | 60 |
| Iron* | 53,000 | 70 | 22,000 | 1,358 |
| Lead | 164 | — | 73 | — |
| Lithium | 42 | — | 35 | — |
| Magnesium | 20,000 | ND | 24,000 | 366 |
| Manganese* | 1,810 | 0.7 | 1,100 | 100 |
| Mercury | 0.3 | ND | 0.28 | ND |
| Molybdenum | 3.5 | ND | 1.5 | ND |
| Nickel | 62 | ND | 26 | ND |
| Phosphorus* | 5,000 | — | 3,500 | — |
| Potassium* | 12,800 | ND | 15,400 | 539 |
| Selenium | ND | ND | ND | ND |
| Silicon* | 560 | 225,630 | 600 | 232,223 |
| Silver | ND | ND | ND | ND |
| Sodium* | 43,000 | 23 | 37,000 | 948 |
| Strontium | 320 | ND | 280 | ND |
| Tellurium | ND | ND | ND | ND |
| Tin | 40 | ND | 8 | ND |
| Titanium* | 5,900 | 677 | 5,400 | 964 |
| Vanadium | 43 | 0.14 | 36 | 2.94 |
| Zinc | 430 | ND | 300 | 13 |
| Total ug/g* | 349,964 | 226,506 | 308,280 | 241,186 |
| % metals in slag | 35 | 23 | 31 | 24 |
| % of slag sample | 50 | 50 | 46 | 54 |
| % of total metals | 61 | 39 | 56 | 44 |
| Gram/tonne refuse | | 63,715 | | 60,065 |
| % of total I/P metals | | 96.9 | | 97.2 |

*The quantities recorded for these metals would increase fairly substantially if they were assumed to exist in their more common oxide form.

Slag Leachate

Table 8 summarizes the metals found in the leachate derived from the slag samples in milligrams (mg) of metal per liter (L) of leachate.

TABLE 8

| | METALS IN SLAG LEACHATE (mg/L) | | | | |
|---|---|---|---|---|---|
| ANALYSES ELEMENT | EXPERIMENT NO 1 | EXPERIMENT NO 2 | ONTARIO REG 309 (7) | % OF ONTARIO REG 309 | QUEBEC REG (8) |
| Aluminum | 0.18 | 0.03 | | | |
| Antimony | ND | 0.006 | | | |

TABLE 8-continued

METALS IN SLAG LEACHATE (mg/L)

| ANALYSES ELEMENT | EXPERIMENT NO 1 | EXPERIMENT NO 2 | ONTARIO REG 309 (7) | % OF ONTARIO REG 309 | QUEBEC REG (8) |
|---|---|---|---|---|---|
| Arsenic | ND | ND | 5.0 | —/— | |
| Barium | 0.03 | 0.1 | 100.0 | 0.03/0.1 | |
| Beryllium | ND | ND | | | |
| Bismuth | ND | ND | | | |
| Boron | ND | ND | 500.0 | —/— | |
| Cadmium | ND | ND | 0.5 | —/— | 0.1 |
| Calcium | 3.3 | 1.15 | | | |
| Chromium | ND | ND | 5.0 | —/— | 0.5 |
| Cobalt | ND | ND | | | |
| Copper | 0.07 | 0.09 | | | 1.0 |
| Iron | 0.57 | 1.79 | | | 17.0 |
| Lead | 0.01 | 0.02 | 5.0 | 0.2/0.4 | 0.1 |
| Lithium | ND | ND | | | |
| Magnesium | 0.2 | 0.15 | | | |
| Manganese | 0.02 | 0.01 | | | |
| Mercury | ND | ND | 0.1 | —/— | 0.001 |
| Molybdenum | ND | ND | | | |
| Nickel | 0.005 | 0.01 | | | 1.0 |
| Phosphorus | ND | ND | | | |
| Potassium | 0.1 | 0.05 | | | |
| Selenium | ND | ND | 1.0 | —/— | |
| Silica | 1.16 | 0.68 | | | |
| Silver | ND | ND | 5.0 | —/— | |
| Sodium | 0.1 | 1.3 | | | |
| Strontium | ND | ND | | | |
| Tellurium | ND | ND | | | |
| Tin | ND | ND | | | |
| Titanium | ND | ND | | | |
| Vanadium | ND | 0.015 | | | |
| Zinc | 0.05 | 0.02 | | | 1.0 |

Table 9 contains comparative data on leachate analyses for selected metals from various incinerator sources obtained from recent NITEP publications.

TABLE 9

COMPARISON OF SELECTED METALS IN SLAG LEACHATE (mg/L)

| ANALYSES ELEMENT | EXP NO 1 | EXP NO 2 | SWARU BOTTOM ASH(6) | QUC BOTTOM ASH(4) | LONDON BOTTOM ASH(5) | LONDON BOILER ASH(5) | ONTARIO REG 309 (7) | QUEBEC REG (8) |
|---|---|---|---|---|---|---|---|---|
| Aluminum | 0.18 | 0.03 | 0.11 | | 1.29 | 3.04 | | |
| Antimony | ND | 0.006 | ND | | ND | ND | | |
| Arsenic | ND | ND | 0.29 | | 0.01 | 0.03 | 5.0 | |
| Barium | 0.03 | 0.1 | | | | | 100.0 | |
| Boron | ND | ND | 1 | 1.4 | 2.1 | 1.6 | 500.0 | |
| Cadmium | ND | ND | ND | 0.05 | 0.14 | 43.2 | 0.5 | 0.1 |
| Chromium | ND | ND | ND | 0.06 | 0.18 | ND | 5.0 | 0.5 |
| Cobalt | ND | ND | ND | | 0.20 | 0.27 | | |
| Copper | 0.07 | 0.09 | 0.5 | 0.39 | 0.87 | 16.1 | | 1.0 |
| Lead | 0.01 | 0.02 | ND | 8.0 | 6.83 | 4.15 | 5.0 | 0.1 |
| Mercury | ND | ND | | | | | 0.1 | 0.001 |
| Nickel | 0.005 | 0.01 | 0.8 | 0.64 | 0.59 | 0.87 | | 1.0 |
| Selenium | ND | ND | | | | | 1.0 | |
| Silver | ND | ND | | | | | 5.0 | |
| Zinc | 0.05 | 0.02 | 32 | 27 | 55 | 1340 | | 1.0 |

ENERGY BALANCE

Table 10 summarizes energy balance characteristics both in the lab and extrapolated for a 50-70 Tonne Per Day commercial size system. Commercial size extrapolation includes known improvements obtainable through the use of a larger size and more efficient plasma arc torch, the use of additional refractory lining in the wall of the reactor vessel and economies of scale for heat losses. Conversion ratio is defined as the energy in the product gas compared to the electrical energy input to the process which created the product gas. Complete details are contained in Volume 2.

TABLE 10

ENERGY BALANCE CHARACTERISTICS

| PERFORMANCE CHARACTERISTIC | EXPERIMENT NO 1 LAB RESULTS | EXPERIMENT NO 1 COMMERCIAL SIZE | EXPERIMENT NO 2 LAB RESULTS | EXPERIMENT NO 2 COMMERCIAL SIZE |
|---|---|---|---|---|
| Conversion ratio (Energy Out/In) | 1.52:1 | 3.03:1 | 1.92:1 | 3.54:1 |
| Overall efficiency (%) | 53.6 | 65.2 | 54.5 | 62.7 |
| Product gas/refuse HV ratio | 0.83 | 0.83 | 0.76 | 0.76 |

TABLE 10-continued

| | ENERGY BALANCE CHARACTERISTICS | | | |
|---|---|---|---|---|
| | EXPERIMENT NO 1 | | EXPERIMENT NO 2 | |
| PERFORMANCE CHARACTERISTIC | LAB RESULTS | COMMERCIAL SIZE | LAB RESULTS | COMMERCIAL SIZE |
| Wet refuse/slag weight reduction | 8.93:1 | 8.93:1 | 8.89:1 | 8.89:1 |
| Wet refuse/slag volume reduction | 184:1 | 184:1 | 183:1 | 183:1 |
| E1 Energy per Tonne Refuse (KWhrs) | 1607 | 806 | 1171 | 635 |

Table 11 shows the change in performance by combining the product gas enthalpy and heating value energies, which is a very logical extension since the hot product gas will normally be provided directly to a combustion process for the immediate utilization of the available energy.

TABLE 11

| | ENERGY BALANCE CHARACTERISTICS (Combining product gas enthalpy and heating value) | | | |
|---|---|---|---|---|
| | EXPERIMENT NO 1 | | EXPERIMENT NO 2 | |
| PERFORMANCE CHARACTERISTIC | LAB RESULTS | COMMERCIAL SIZE | LAB RESULTS | COMMERCIAL SIZE |
| Conversion ratio (Energy Out/In) | 1.91:1 | 3.80:1 | 2.30:1 | 4.24:1 |
| Overall efficiency (%) | 67.2 | 81.7 | 65.5 | 75.3 |
| Product gas/refuse HV ratio | 1.04 | 1.04 | 0.92 | 0.92 |
| Wet refuse/slag weight reduction | 8.93:1 | 8.93:1 | 8.89:1 | 8.89:1 |
| Wet refuse/slag volume reduction | 184:1 | 184:1 | 183:1 | 183:1 |
| E1 Energy per Tonne Refuse (KWhrs) | 1607 | 806 | 1171 | 635 |

Table 12 summarizes the product gas chemical composition:

TABLE 12

| PRODUCT GAS CHEMICAL COMPOSITION | |
|---|---|
| Hydrogen | 33.0% |
| Carbon Dioxide | 9.2% |
| Ethylene | 0.1% |
| Acetylene | 0.0% |
| Oxygen | 3.8% |
| Nitrogen | 32.1% |
| Methane | 1.8% |
| Carbon Monoxide | 20.0% |
| Heating Value | 202.5 BTU/SCF |

MASS BALANCE

Table 13 summarizes the mass balance characteristics.

TABLE 13

| | MASS BALANCE CHARACTERISTICS | |
|---|---|---|
| MASS ELEMENT | EXPERIMENT NO 1 DECEMBER 12, 1990 (90 MIN DURATION) | EXPERIMENT NO 2 DECEMBER 14, 1990 (150 MIN DURATION) |
| Wet refuse input (kg) | 125.1 | 262.3 |
| Air input - torch (kg) | 16.3 | 27.2 |
| Air input - viewing port (kg) | 4.9 | 8.2 |
| Air input through feeder (kg) (found by difference) | 128.7 | 86.3 |
| Total mass input (kg) | 275.0 | 384.0 |
| Product gas output (kg) | 228.9 | 323.3 |
| Slag output (kg) | 13.8 | 29.0 |
| Cyclone ash output (kg) | 0.2 | 0.7 |
| Water in product gas (kg) | 7.1 | 13.0 |
| Water condensed (kg) | 25.0 | 18.0 |
| Total mass output (kg) | 275.0 | 384.0 |
| Condensed water/refuse ratio | 0.20 | 0.069 |

COMMERCIAL USAGE OF THE SLAG

Potential uses of the slag from the plasma gasification process were reviewed by Energy, Mines and Resources personnel, and their findings are contained in Volume 2. The following potential uses were considered feasible in the indicated order of priority:

a. use as a supplementary cementing material in concrete;
b. use in the production of mineral wool;
c. use in the manufacture of foam glass;
d. use in the production of light weight aggregates; and
e. use in the development of packaging materials.

What is claimed is:

1. A process for gasification of municipal solid waste (MSW) and other carbon based solids, comprising the steps of:
   (i) igniting a plasma arc torch inside a refractory lined reactor vessel;
   (ii) preheating said reactor vessel walls to substantially 1100 C or more; and
   (iii) feeding said MSW into said reactor vessel while minimizing entry of air.

2. A process for gasification of a mixture of municipal solid waster (MSW) and other carbon based solids, comprising the steps of:
   (i) igniting a plasma arc torch and creating a vertical heating zone inside a refractory lined reactor vessel;
   (ii) preheating said reactor vessel walls to substantially 1100° celsius or more; and (iii) feeding said MSW directly into a side portion of said vertical heating zone in said reactor vessel, while minimizing entry of air.

3. The process for gasification of MSW as defined in claim 2, wherein said MSW remains in said vertical heating zone to cause moisture in said MSW to react with said carbon-based solids and to substantially remove said carbon-based solids from said mixture.

4. The process for gasification of MSW as defined in claim 3, wherein said MSW is fed into said reactor vessel by means of a horizontal hydraulic feeder.

5. The process for gasification of MSW as defined in claim 3, wherein product gas is extracted from said reactor vessel at a location which is spaced from the side of said reactor vessel through which MSW is fed.

6. The process for gasification of MSW as defined in claim 5, wherein said MSW is pyrolyzed to form gas and monolithic liquid slag.

7. The process for gasification of MSW as defined in claim 6, wherein said gas which is formed by pyrolysis is exhausted from said gas reactor vessel by means of a cyclone.

8. The process for gasification of MSW as defined in claim 7, wherein said monolithic liquid slag is a silicate mass, which, when cooled, encapsulates any metal compounds and metals which were present in said MSW.

* * * * *